United States Patent
Nakamichi

[19]
[11] Patent Number: 6,157,607
[45] Date of Patent: Dec. 5, 2000

[54] DISK TRANSFER DEVICE WITH DISK ALIGNMENT MECHANISM

[75] Inventor: Niro Nakamichi, Tokyo, Japan

[73] Assignee: Nakamichi Corp., Japan

[21] Appl. No.: 09/189,369

[22] Filed: Nov. 9, 1998

[30] Foreign Application Priority Data

Mar. 9, 1998 [JP] Japan .................................. 10-074890

[51] Int. Cl.[7] .................................................. G11B 17/08
[52] U.S. Cl. .......................................... 369/191; 369/77.1
[58] Field of Search .................................... 369/204, 211, 369/202, 191, 192, 193, 196, 75.1, 75.2, 77.1, 34, 36

[56] References Cited

U.S. PATENT DOCUMENTS

| | | | |
|---|---|---|---|
| 4,682,320 | 7/1987 | d'Alayer de Costemor | 369/77.1 |
| 4,979,160 | 12/1990 | Araki | 369/217 |
| 5,371,640 | 12/1994 | Kvifte et al. | 360/92 |
| 5,459,703 | 10/1995 | Tanaka | 369/36 |
| 5,561,658 | 10/1996 | Nakamichi et al. | 369/263 |

FOREIGN PATENT DOCUMENTS

| | | |
|---|---|---|
| 402227866A | 9/1990 | Japan . |
| 404013265A | 1/1992 | Japan . |

*Primary Examiner*—David L. Ometz
*Assistant Examiner*—Tianjie Chen
*Attorney, Agent, or Firm*—Morrison Law Firm

[57] ABSTRACT

A disk transferring device has a driven disk guide and a fixed disk guide. The fixed disk guide includes a plurality of guide blocks, each having a guide groove. At least one of the guide blocks is a straightening arm that is rotateably mounted on the fixed disk guide through a first and second gear. A spring biases the second gear so that the straightening arm is biased toward a front of the device. As a disk is inserted, the guides move apart. When the guides are moved a predetermined distance, a stopper engages with the second gear and forces it to rotate against the biasing force of the spring. This causes the straightening arm to move into a recessed position away from the disk.

11 Claims, 10 Drawing Sheets

DISK TRANSFER DEVICE WITH DISK ALIGNMENT MECHANISM

BACKGROUND OF THE PRESENT INVENTION

The present invention relates to a disk transfer device, having a driving mechanism which drives one side of a disk outer edge; and a fixed disk guide, which guides the other side of the disk edge in a disk transfer direction. The present invention also relates to a disk transfer device which transfers a disk, which has been inserted into a slot, into the interior of a device.

A disk insertion slot is formed on a device front panel. A disk which is inserted into the slot is loaded to the playback position in the device interior. This slot-in method of disk transferring device is used frequently in car compact disk players. For this type of disk transfer device, devices which have a pair of rollers which clasp the upper and lower surfaces of the disk are well known. An example of this type of device is disclosed in Japanese Examined Patent Publication Number 4-62146, the disclosure of which is hereby incorporated by reference. Problems arise when dust adheres to the surface of the roller, which can cause damage to the recorded surface of the disk.

In Japanese Laid-Open Patent Publication Number 8-241552, the disclosure of which is hereby incorporated by reference, the present applicants have proposed a new disk transfer device wherein a disk right and left edge are clasped by two disk guides which extend in the disk transfer direction. The disk edge is driven by a belt which is internalized in one of the disk guides.

The disk recorded surface is not touched at all.

However, with this disk transfer device, the disk guides could not straighten out the insertion position of the disk to the horizontal position when the disk is being inserted into the device slot. If the operator inserts the disk into the slot at an angle, the disk can contact the edge of the slot or the device's internal mechanism, thereby inflicting damage to the disk.

OBJECT AND SUMMARY OF THE INVENTION

It is an object of the present invention to provide a disk transfer device which overcomes the drawbacks of the prior art.

It is a further object of the present invention to provide a disk transfer device with a means for maintaining an alignment of an inserted disk.

The present invention is a disk transfer device. A disk, which is inserted into a slot, is transferred to a playback position. Right and left outer edges of a disk are clasped between a driven disk guide and a fixed disk guide. The disk outer edge is driven by a belt located inside the driven disk guide. One part of a guide block on the fixed disk guide is attached so that it can freely pivot with respect to the fixed disk guide. The guide block is biased by a spring such that its tip is facing the direction of the slot. A disk which is inserted into the slot immediately has its foremost point guided to a guide groove of the guide block. The disk position is straightened out into the horizontal position.

Briefly stated, a disk transferring device has a driven disk guide and a fixed disk guide. The fixed disk guide includes a plurality of guide blocks, each having a guide groove. At least one of the guide blocks is a straightening arm that is rotateably mounted on the fixed disk guide through a first and second gear. A spring biases the second gear so that the straightening arm is biased toward a front of the device. As a disk is inserted, the guides move apart. When the guides are moved a predetermined distance, a stopper engages with the second gear and forces it to rotate against the biasing force of the spring. This causes the straightening arm to move into a recessed position away from the disk.

According to an embodiment of the present invention, a disk transferring device with a means for maintaining an alignment of a disk comprises at least a first and second disk transfer guide. The first and second disk transfer guides are effective to guide a disk in first and second directions opposing one another. The first disk transfer guide has at least one guide element moveably mounted thereon. The guide element is effective to move to at least an angled position with respect to the first and second disk transfer guides. The at least one guide element is effective to contact and guide an edge of said disk thereby maintaining said alignment during a movement of said disk.

According to another embodiment of the present invention, a disk transferring device with a means for maintaining an alignment of a disk, comprises a first and second disk transfer guide. The first and second disk transfer guides are effective to guide a disk in a first and second direction opposing one another. The first disk transfer guide has at least one guide element, at least one stationary element, and at least one hole. The at least one guide element is mounted on said first disk transfer guide and is effective to contact and guide an edge of said disk thereby maintaining said alignment. The at least one guide element has a sloped surface, a guide groove, and a positioning pin. The guide element is effective to move to an angled position with respect to the first and second directions. The hole is effective to mate with the positioning pin. A first gear is disposed on said at least one guide element. A second gear is moveably mounted on said first disk transfer guide. The first and second gears are effective to mate with one another. A spring creates a biasing force biasing said second gear so that said at least one guide element is biased toward a front of said disk transferring device. A stopper is disposed so that if at least one of said first and second disk transfer guides moves past a predetermined position, said stopper moves said second gear against said biasing force thereby moving said at least one guide element away from said front of said disk transferring device and toward a recessed position with respect to said edge.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
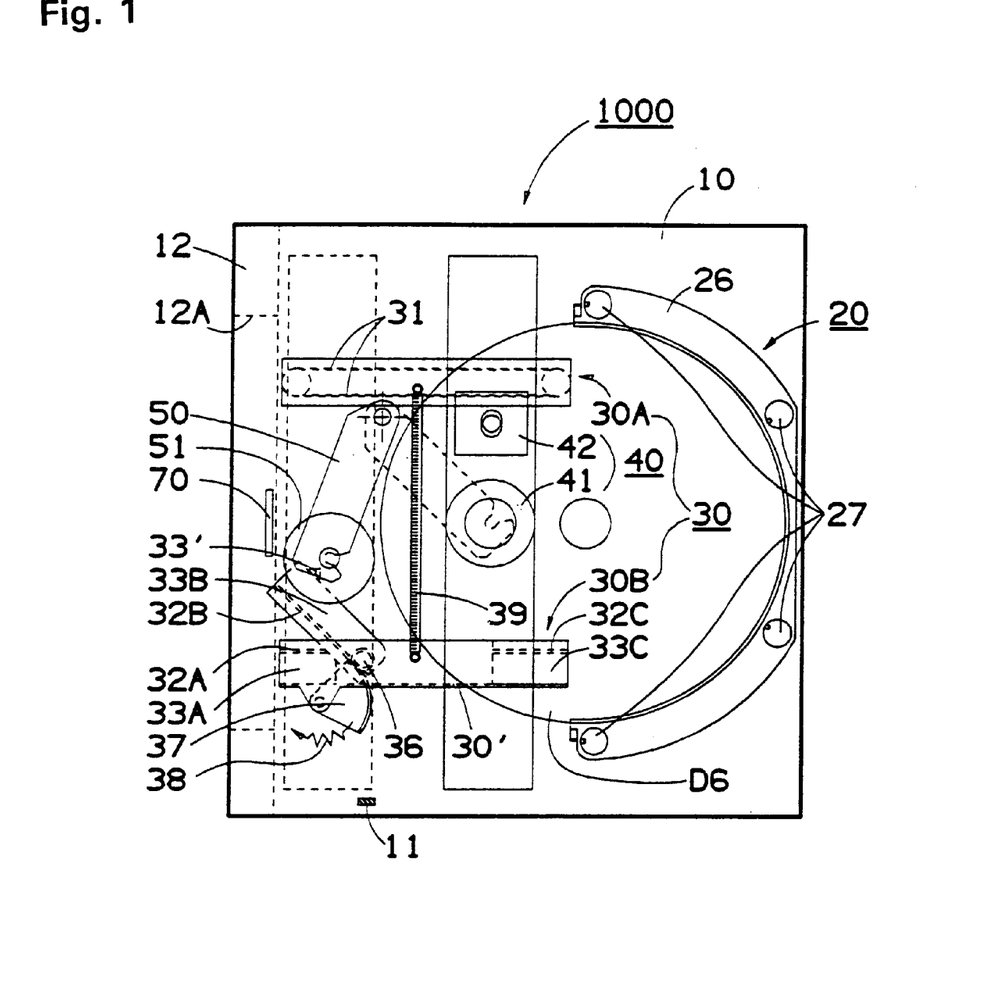
FIG. 1 is a schematic top-view drawing of a changer-type disk playback device 1000 in which the disk transfer mechanism of the present invention is implemented.

Referring to FIG. 1, disk playback device 1000 includes a stocker 20 which is capable of holding 6 large size disks D1–D6 of diameter 12 cm (see, for example, FIG. 14) on a single axis at the rear of the device. Stocker 20 has 2-mm thick, arc-shaped disk holders 21–26 (only the top disk holder 26 is shown in FIG. 1). Disk holders 21–26 have a disk housing groove which supports the outer edge of disks D1–D6 respectively.

Disk holders 21–26 are guided by a spiral guide (not shown) which has an irregular pitch and which is formed on the outer edge of four stocker screws 27. Disk holders 21–26 are moved vertically by the spiral guide. The high pitch at the center of stocker screws 27 increases the spacing between a playback disk at the center location and the disks stored above and below it (see FIGS. 14 and 16). Japanese application number 9-105135 submitted by the present applicants is used as a reference for details of stocker screw 27, the disclosure of which is hereby incorporated by reference.

A disk transfer device 30 includes a driven disk guide 30A and a fixed disk guide 30B. An inserted disk (FIG. 3) is transferred between the following three positions: an eject position (FIGS. 3 and 4) which is for inserting or removing the disk where it projects out from a slot 12A of a front panel 12; a playback position (FIGS. 9 and 10) which is used to conduct disk playback; and a storage position (FIGS. 13 and 14) which is used to store the disk within the disk holder in a position that is lined up with the disk transfer surface. Driven and fixed disk guides 30A, 30B are guided to move in parallel between a minimum spacing (FIG. 1), which is capable of clasping a small size disk (not shown) of diameter 8 cm, and a maximum spacing (FIG. 11), which is wider that a diameter of a large size disk. Driven and fixed disk guides 30A, 30B are connected by a pinion gear (not shown) to move in opposite directions. Both driven and fixed guides 30A, 30B are biased toward each other by a spring 39.

The following explanation will refer to an inserted disk D4 but it should be apparent that the same disclosure would apply to any inserted disk.

Driven disk guide 30A has a guide block (not shown) which guides the left side of the outer edge of disk D4 in the disk transfer direction (in the direction towards the front or back of the device). In the guide block, a belt 31 drives the left outer edge of the disk. Fixed disk guide 30B includes guide blocks 33A–33C (seen most clearly in FIGS. 19 and 20) which guide the right outer edge of the disk in the disk transfer direction. In guide blocks 33A–33C are guide grooves 33A'–33C'. In guide grooves 33A'–33C' (only guide groove 33B' is shown in FIG. 20), there are attached friction sheets 32A–32C which have a high friction coefficient to prevent slipping of the disk outer edge.

Figure 19:
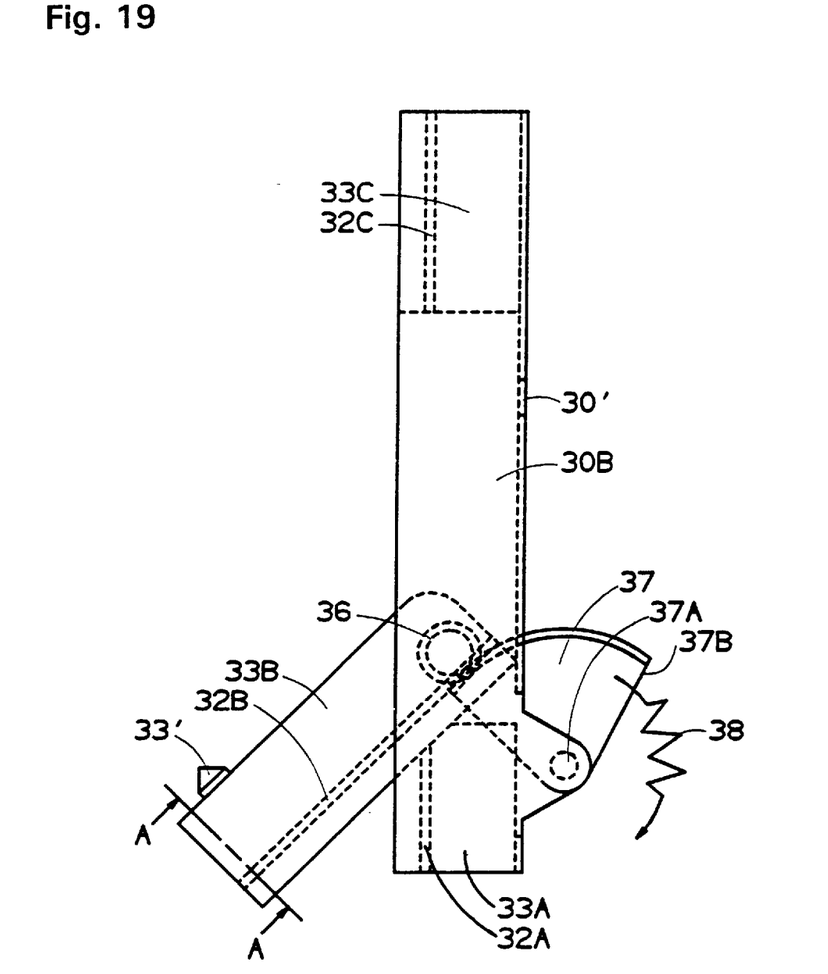
FIG. 19 is an enlarged top view drawing of fixed disk guide 30B.
Figure 20:
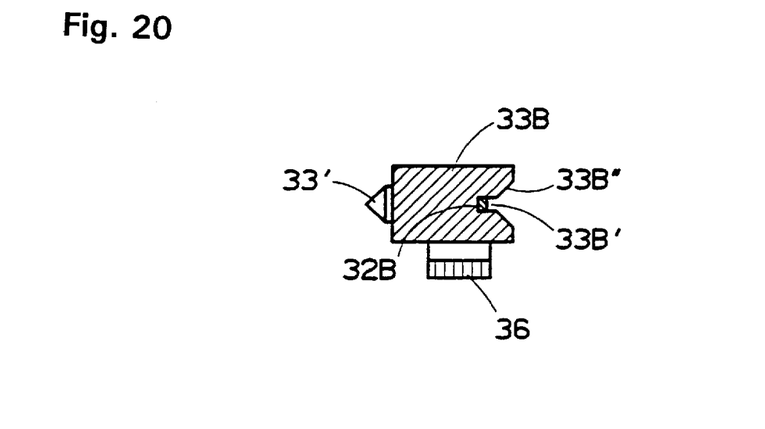
FIG. 20 is a cross-sectional drawing along the line A—A of FIG. 19.

Referring to the enlarged view in FIG. 19, the guide block of fixed disk guide 30B is divided into three distinct elements (33A–33C). The middle guide block 33B is also called a straightening arm which straightens the disk into a horizontal position at the time of disk insertion. Straightening arm 33B is attached so that it can pivot freely with respect to disk guide 30B around a center of first gear 36. On the lower surface of straightening arm 33B, is first gear 36 (FIG. 20). First gear 36 engages with a fan-shaped second gear 37. Second gear 37 is attached so that it can pivot freely with respect to fixed disk guide 30B with axis 37A as the center. A spring 38 biases second gear 37 in the clockwise direction. As a result, straightening arm 33B pivots in the counter-clockwise direction by the force of spring 38.

Referring to FIG. 1, straightening arm 33B is positioned at an angle where its side surface engages with the side of guide block 33A. At this time, the tip of straightening arm 33B is facing towards slot 12A. As a result, the tip of disk D4 which is inserted into slot 12A is guided right away to inside guide groove 33B' by a sloped surface 33B" of straightening arm 33B. The position of the disk is straightened out to the horizontal position.

Figure 9:
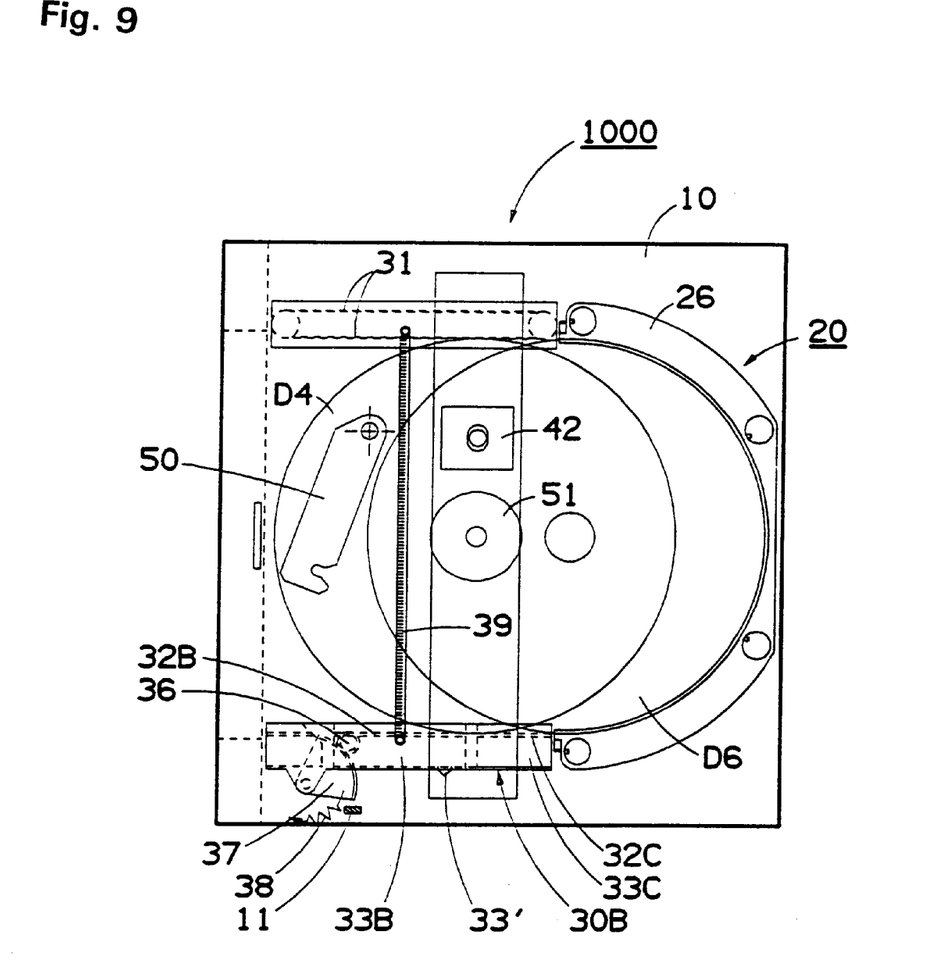
FIG. 9 is a schematic top-view drawing for the purpose of describing the disk loading operations of disk playback device 1000.

Referring to FIG. 9, straightening arm 33B is shown lined up with the other guide blocks 33A and 33C. In order not to have any unevenness between guide groove 33B' and the guide grooves on the other guide blocks 33A and 33C, a positioning pin 33' is placed on the back surface of straightening arm 33B. Positioning pin 33' is inserted into a hole 30' (seen most clearly in FIG. 19) in the side of fixed disk guide 30B.

When disk D4 has been brought to the playback position, in order to separate straightening arm 33B from the outer edge of disk D4, there is attached on a chassis 10 a stopper 11 which engages with the side surface of straightening arm 33B. When driven and fixed disk guides 30A, 30B move from the position shown in FIG. 9 where they engage the outer edge of disk D4, to the position shown in FIG. 11 where they are spread apart, stopper 11 engages the side surface of second gear 37. In opposition to the force of spring 38, stopper 11 pivots second gear 37 in a counter-clockwise direction. As a result, linked with the movement of second gear 37, straightening arm 33B pivots in a clockwise direction. Straightening arm 33B is thus separated from the outer edge of disk D4.

Referring to FIGS. 1–4, a flap 70 prevents the insertion of a disk into slot 12A. With an axis 71 as the center, flap 70 opens and shuts between a closed position (FIG. 2) which closes slot 12A and an opened position (FIG. 4) which opens slot 12A.

Disk D4 which has been transferred to the playback position is played by a play back means 40 which includes a turntable 41 and an optical head 42. According to the device of the present embodiment, in order to shorten the depth measurement of the device, disk playback means 40 moves forward and back between an insertion position (solid line in FIG. 1), where it is inserted among the stored disks inside stocker 40, and a disk exchange position (dotted line in FIG. 1) where it retreats on the outside of the stored disks. Furthermore, disk playback means 40 moves vertically in the insertion position in order to load disk D4 which has been brought to playback position on top of turntable 41.

Disk D4, which is placed on turntable 41, is anchored by a damper 51. Clamper 51 has a magnetic material such that it is pulled by a magnet (not shown) attached on top of turntable 41. Clamper 51 is relatively weakly locked to the tip of a damper arm 50 by a lock arm (not shown) which is freely pivoted to the tip of damper arm 50. Japanese patent application number 9-115161 can be referred to for detailed description of the clamper, the disclosure of which is hereby incorporated by reference.

Referring to FIG. 1, damper arm 50 is attached to chassis 10 so that it can pivot between the position indicated by the solid line and the position indicated by the dotted line. In the solid line position, damper 51 is held outside any stored disks. In the dotted line position, damper 51 is rotated clockwise and brought to the central surface of disk D4 which is placed on turntable 41. In order to prevent damper 51 catching on the edge of disk D4 during the pivoting of damper arm 50, damper arm 50 moves slightly upward in addition to its clockwise pivoting.

Representative operations of playback device 1000, which is described above, will be described below.

Referring again to FIGS. 1 and 2, large size disk D4 is inserted into slot 12A. The actions until the commencing of playback will be explained. Stocker 20 is in a position 4 where it is capable of disk storage at stocker plate 24 (not shown) which is fourth from the bottom. All of the remaining stocker plates are storing large size disks D1–D3, D5, D6. Driven and fixed disk guides 30A and 30B are biased toward each other by spring 39 to a spacing which is capable of clasping a small size disk. Straightening arm 33B is positioned by the force of spring 38 at an angle where straightening arm 33B engages the side of guide block 33A. Flap 70 is closed. Disk insertion is prohibited.

Figure 2:
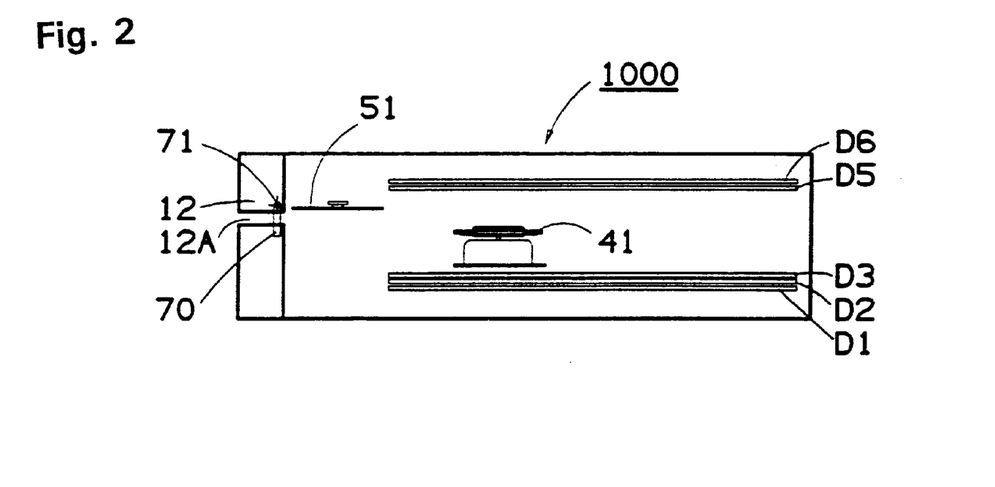
FIG. 2 is a schematic side view drawing of the changer-type disk playback device 1000 shown in FIG. 1.

In order to insert a disk, a disk selection key (not shown) for a storage location where a disk is not stored must be operated to open flap 70. Referring to FIG. 2, since there is no disk stored in position 4, disk selection key 4 (not shown) is pushed. Flap 70 pivots towards the exterior of the device to the opened position.

Figure 3:
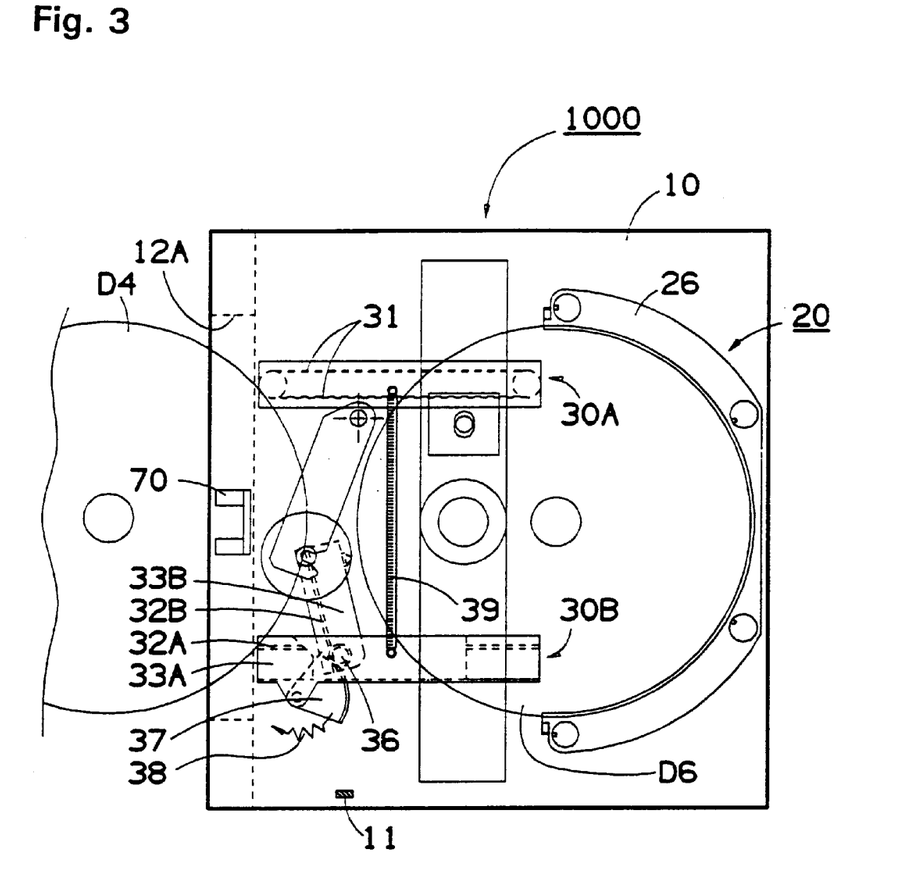
FIG. 3 is a schematic top-view drawing for the purpose of describing the disk loading operations of disk playback device 1000.
Figure 4:
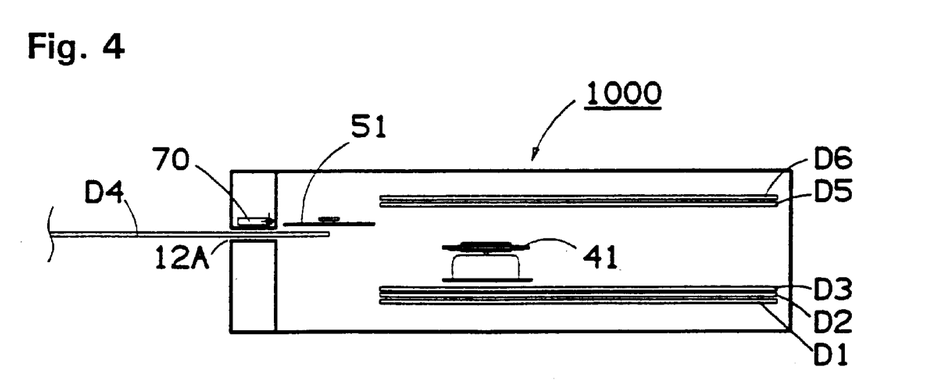
FIG. 4 is a schematic side view drawing of disk playback device 1000 shown in FIG. 3.
Figure 5:
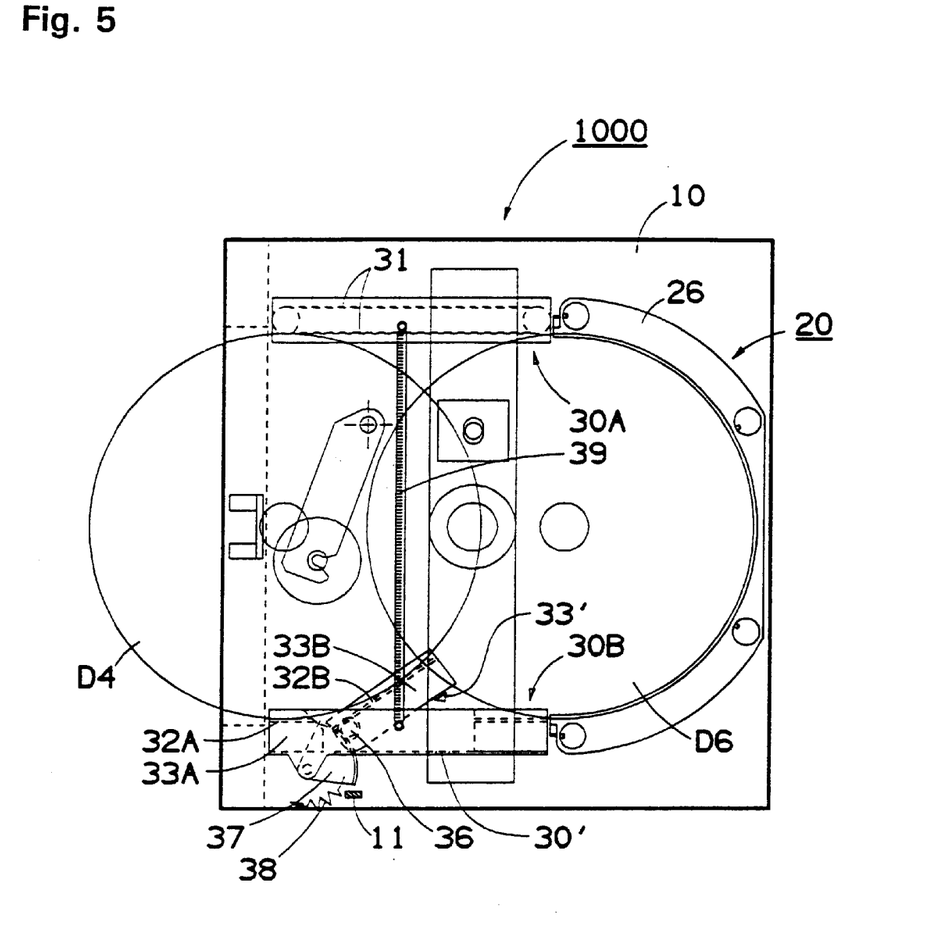
FIG. 5 is a schematic top-view drawing for the purpose of describing the disk loading operations of disk playback device 1000.
Figure 6:
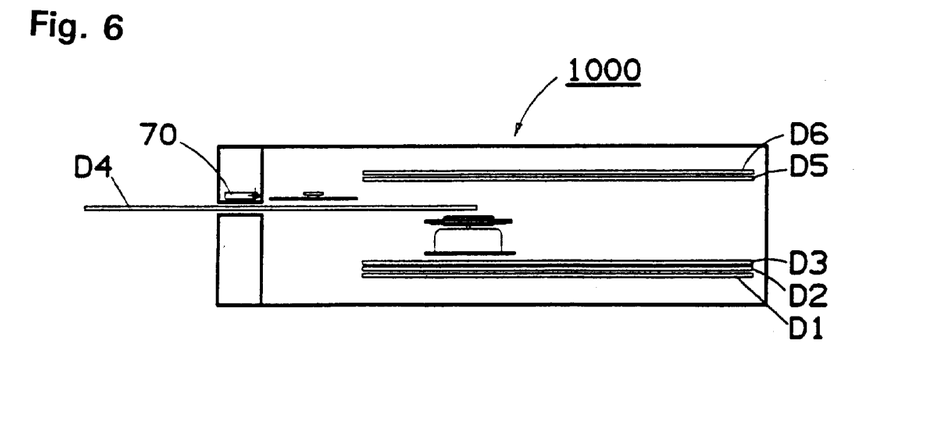
FIG. 6 is a schematic side view drawing of disk playback device 1000 shown in FIG. 5.
Figure 7:
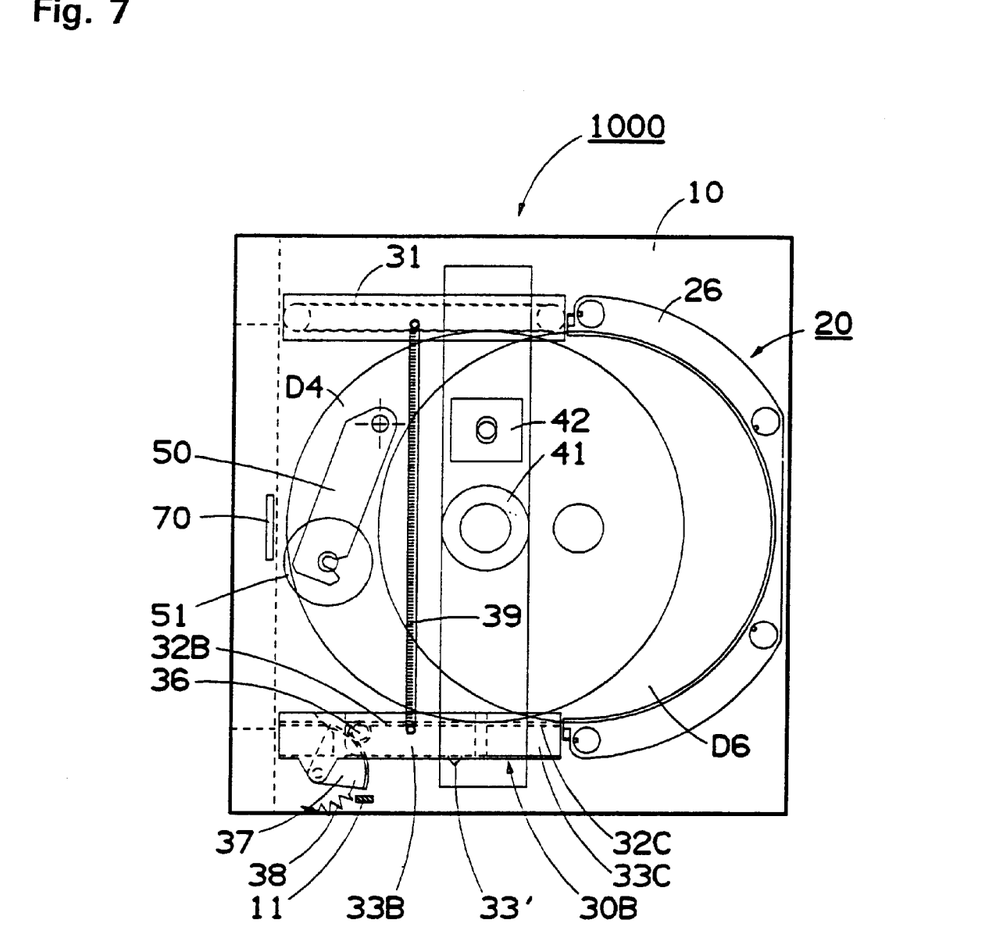
FIG. 7 is a schematic top-view drawing for the purpose of describing the disk loading operations of disk playback device 1000.
Figure 8:
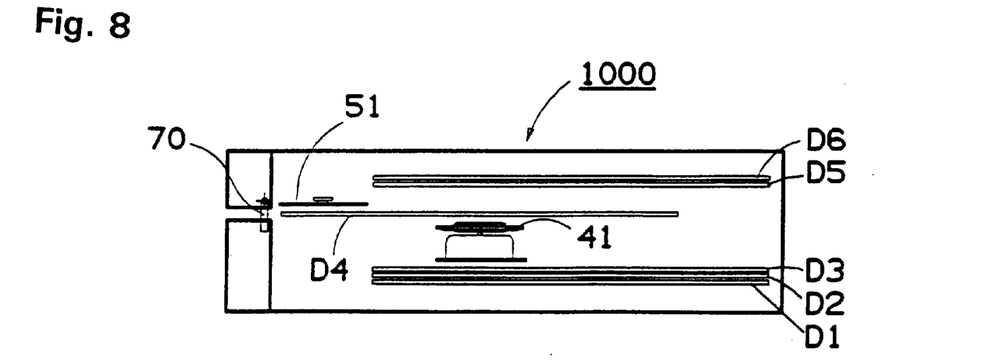
FIG. 8 is a schematic side view drawing of disk playback device 1000 shown in FIG. 7.

Referring to FIGS. 3 and 4, large-size disk D4 is inserted into disk insertion opening 12A. The tip of disk D4 immediately enters guide groove 33B' of straightening arm 33B. Disk D4 is straightened into a horizontal position. With the insertion of the disk, straightening arm 33B pivots clockwise in opposition to the force of spring 38, and the disk position is maintained at the horizontal. The left and right outer edges of disk D4 engage guide grooves of driven disk guide 30A and guide grooves 33A'–33C' of fixed disk guide 30B. When both driven and fixed disk guides 30A and 30B are pushed away from each other a specified distance, the rotational drive of belt 31 in the counterclockwise direction is begun. Referring to FIGS. 5 and 6, when disk D4 is clasped along its positions by driven and fixed disk guides 30A, 30B, disk D4 rotates in the clockwise direction by the driving force of belt 31, and it is transferred inside the device.

Figure 10:
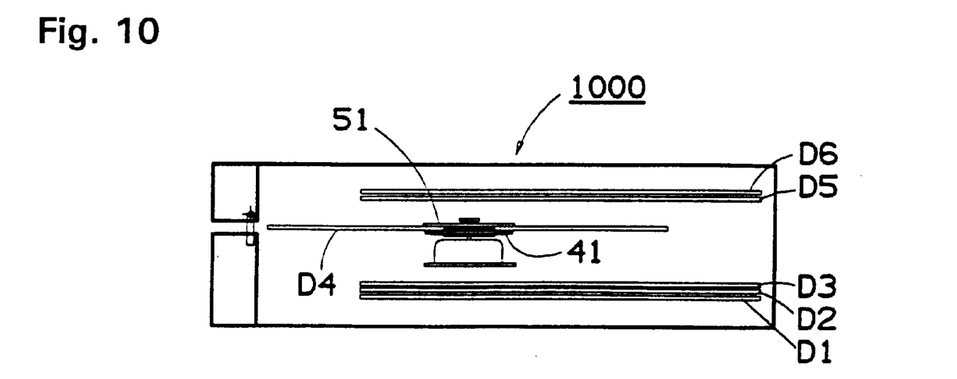
FIG. 10 is a schematic side view drawing of disk playback device 1000 shown in FIG. 9.

When disk D4 is transferred to the playback position where it has the same axis as turntable 41, the rotational drive of belt 31 is stopped. In order to prevent the double insertion of a disk, flap 70 is closed. Next, damper arm 50 is driven in the counterclockwise direction. Clamper 51 is brought to the center of disk D4. Next, when disk playback means 40 is raised, damper 51 is pulled by a magnet (not shown) which is attached on top of turntable 41. Disk D4 is thereby fixed on top of turntable 41. Next, when damper arm 50 pivots in the clockwise direction, a lock arm (not shown), which is attached to the tip of damper arm 50, has its lock forcibly released together with the pivoting of damper arm 50. This is because damper 51 is pulled and anchored on top of the turntable 41. The lock arm and damper arm 50 are then both brought to a holding position (FIGS. 9, 10).

Figure 11:
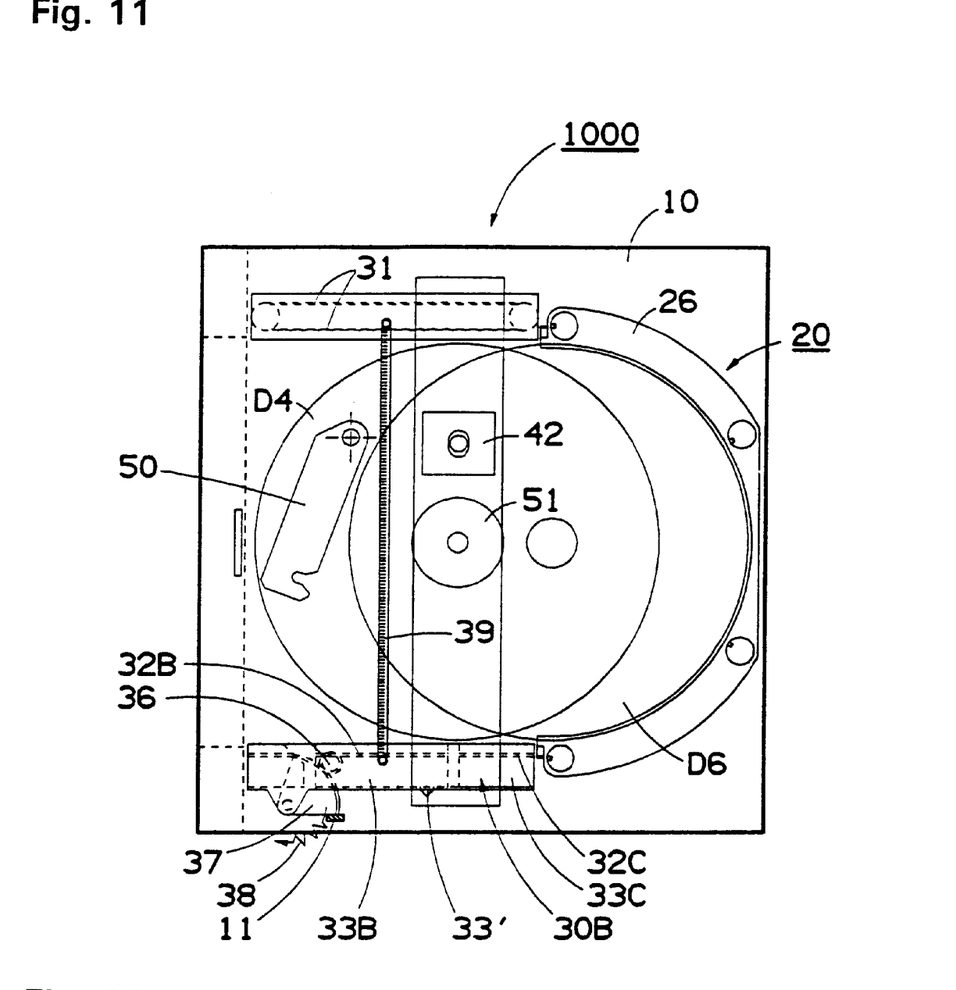
FIG. 11 is a schematic top-view drawing of disk playback device 1000 during the playback of disk D4.
Figure 12:
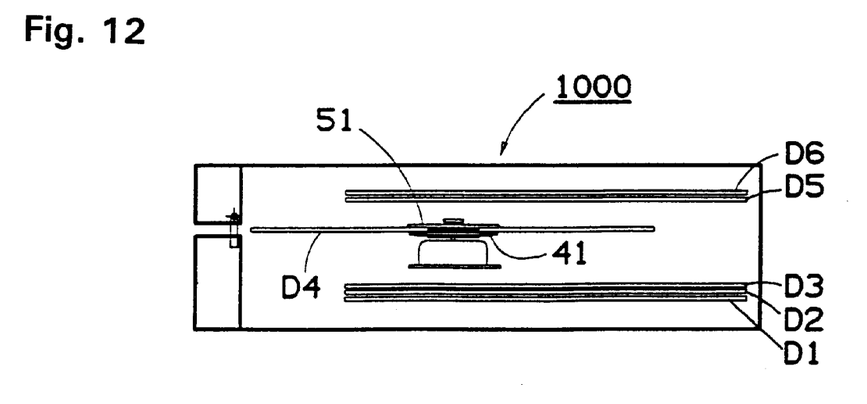
FIG. 12 is a schematic side view drawing of disk playback device 1000 shown in FIG. 11.

Thereafter, both driven and fixed disk guides 30A, 30B are further spread apart. Normally, straightening arm 33B pivots in a counterclockwise direction by the force of spring 38. But as driven and fixed disk guides 30A and 30B are spread further apart, the side surface of second gear 37 engages stopper 11. This causes straightening arm 33B to pivot clockwise together with the opening of the guides and in opposition with the force of spring 38. Straightening arm 33B thus separates from the outer edge of disk D4 (FIGS. 11 and 12).

As described above, disk D4 is no longer in contact with damper arm 50 or driven and fixed disk guides 30A, 30B. Afterwards, disk D4 rotates at the determined rotation speed, and the recorded information is read by optical head 42.

Figure 13:
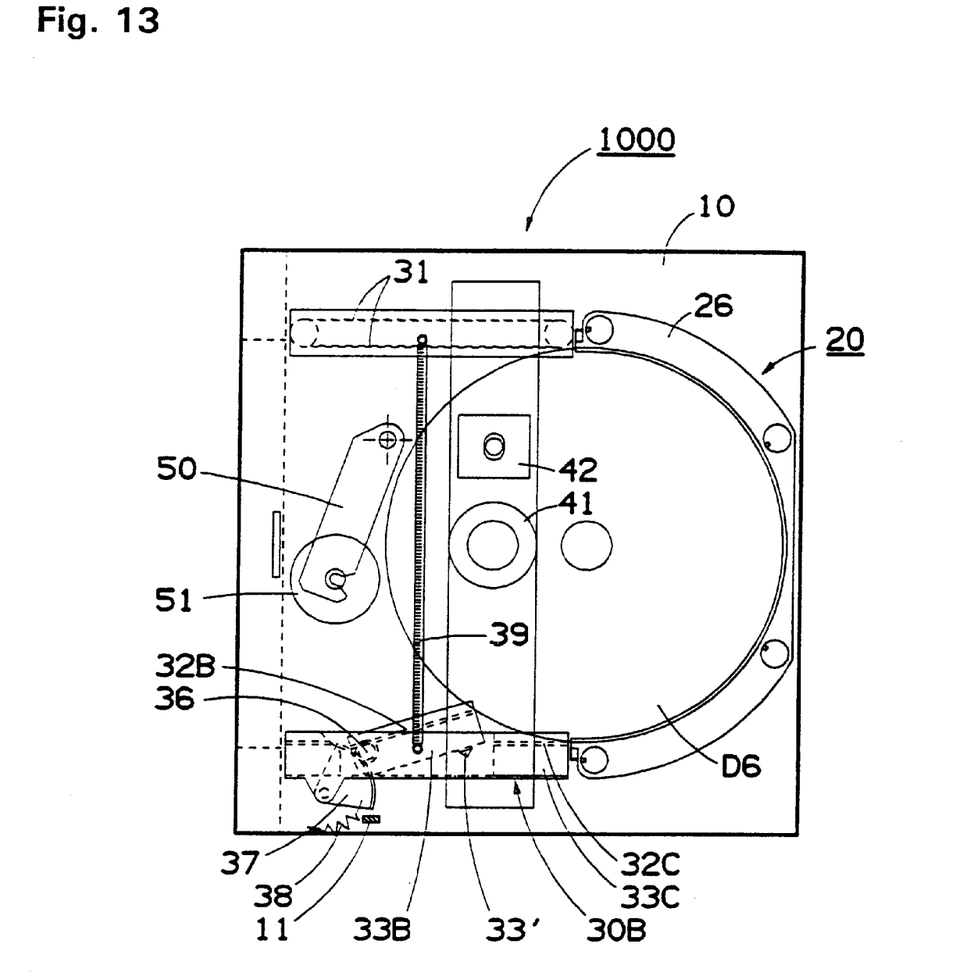
FIG. 13 is a schematic top-view drawing for the purpose of describing the disk exchanging operations of disk playback device 1000.
Figure 14:
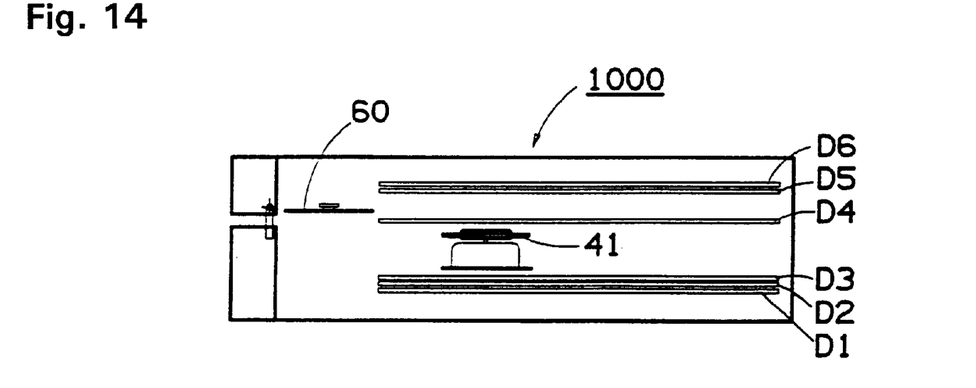
FIG. 14 is a schematic side view drawing of disk playback device 1000 shown in FIG. 13.

Next, the disk exchanging action is explained. The actions follow when disk selection key 3 (not shown) is operated, and disk D4 is exchanged with disk D3, stored in stocker 20. When disk selection key 3 is pushed while disk D4 is in playback, disk rotation is stopped, and playback action is stopped. Both driven and fixed disk guides 30A, 30B are brought toward each other. Straightening arm 33B has reverse actions from that described above. Disk D4 is clasped by driven and fixed disk guides 30A and 30B which are driven by the force of spring 39. Clamper arm 50 is driven in the counterclockwise direction. The lock arm (not shown) on the clamper arm tip self-locks clamper 51. Next, when disk playback means 40 moves downward, the pulling force on damper 51 is weakened. When damper arm 50 pivots in the counterclockwise direction, damper 51, together with damper arm 50, retreats to the unclamped position. Next, when belt 31 rotates in the counterclockwise direction, disk D4 rotates in the clockwise direction, for transfer toward the rear of the device. Disk D4 is stored within stocker 20 (FIGS. 13 and 14). During this disk transfer, second gear 37 does not engage stopper 11 and so straightening arm 33B pivots in a counterclockwise direction from the force of spring 38. Straightening arm 33B thus continues to engage with outer edge of disk D4.

Figure 15:
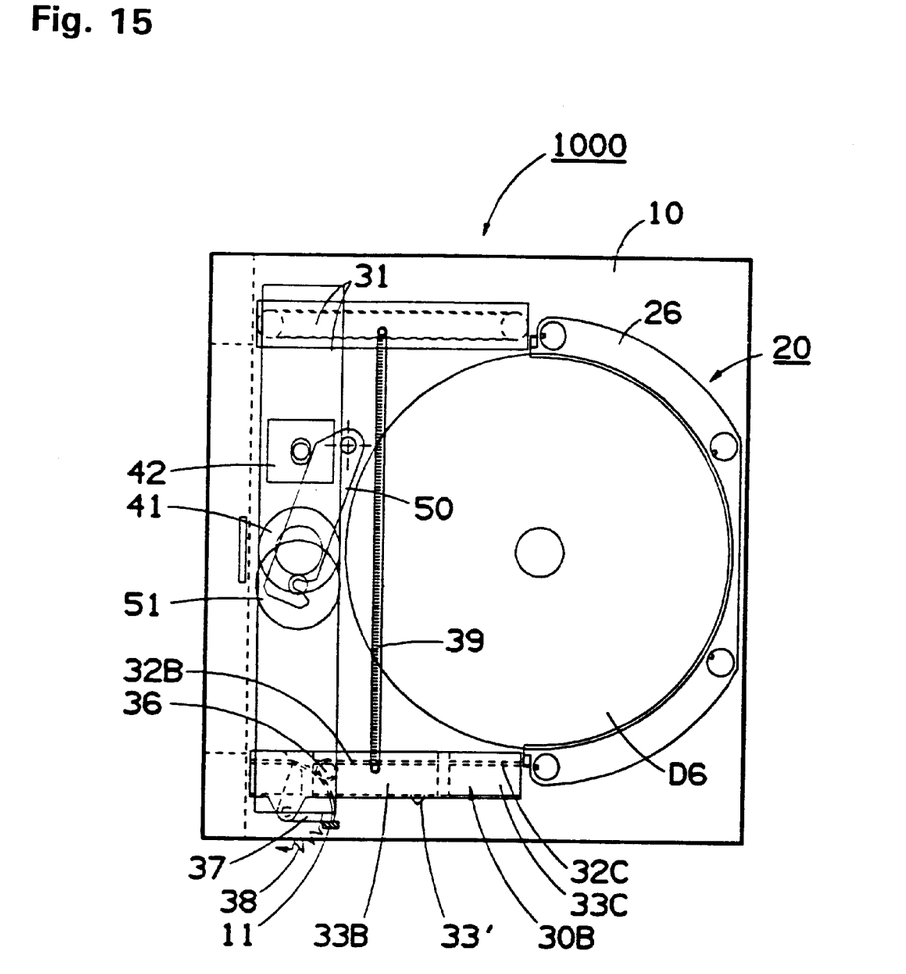
FIG. 15 is a schematic top-view drawing for the purpose of describing the disk exchanging operations of disk playback device 1000.
Figure 16:
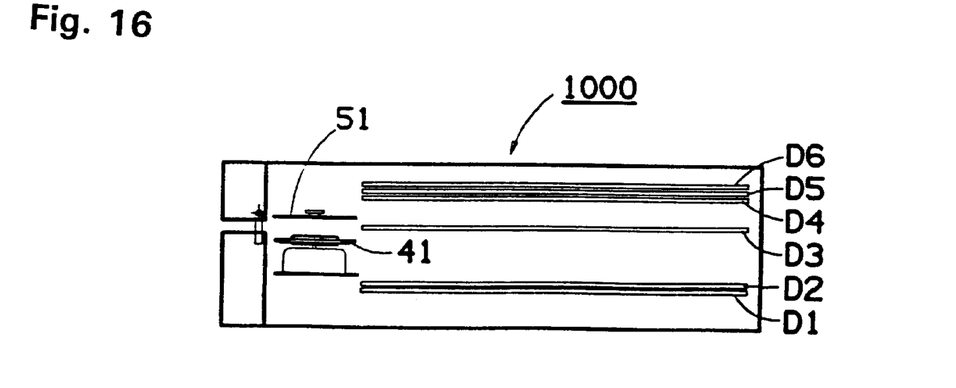
FIG. 16 is a schematic side view drawing of disk playback device 1000 shown in FIG. 15.
Figure 17:
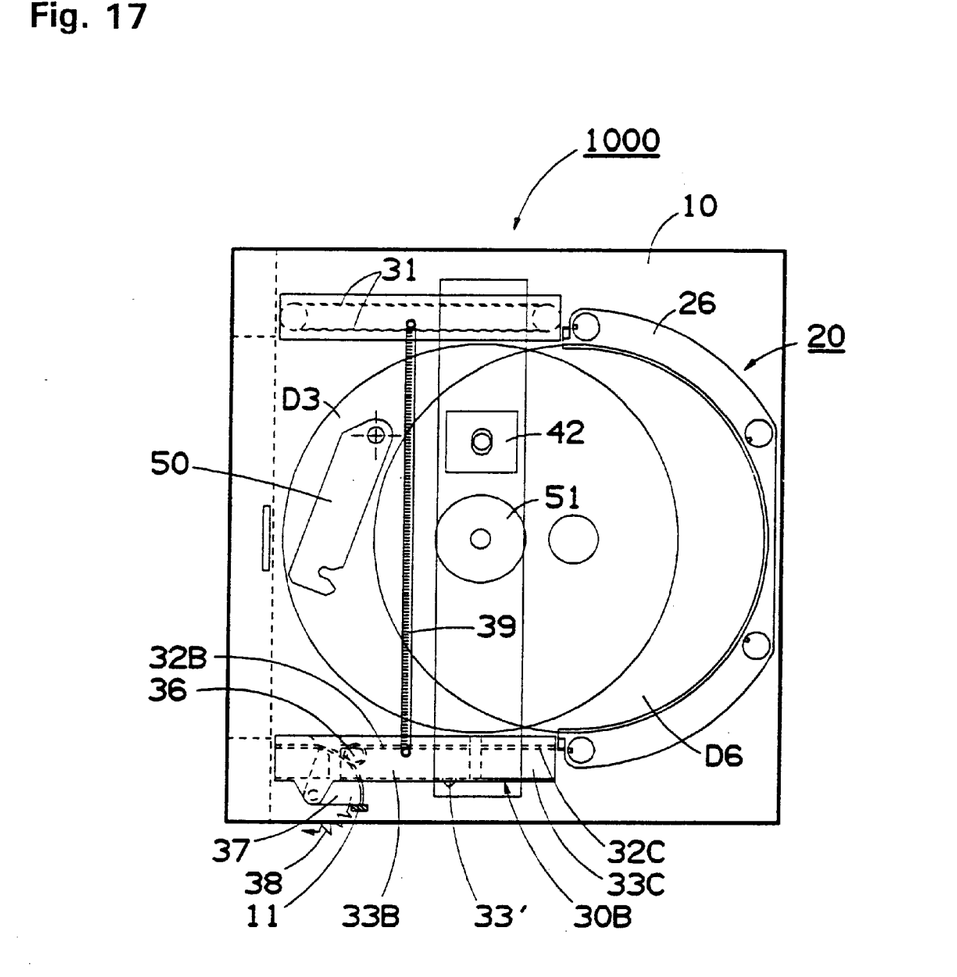
FIG. 17 is a schematic top-view drawing of disk playback device 1000 during the playback of disk D4.
Figure 18:
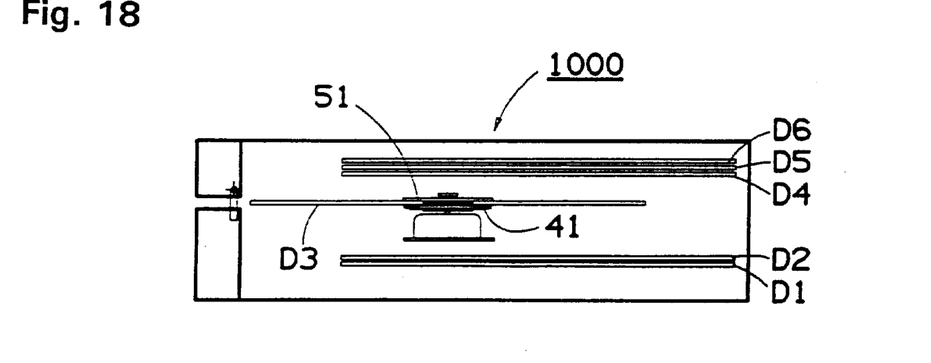
FIG. 18 is a schematic side view drawing of disk playback device 1000 shown in FIG. 17.

When both driven and fixed disk guides 30A and 30B are moved away from each other, second gear 37 engages stopper piece 11. This causes second gear 37 to pivot in a counterclockwise direction coupled with the movement of fixed disk guide 30B. Straightening arm 33B thereby pivots in a clockwise direction and is separated from the outer edge of disk D4 (FIGS. 15, 16). As described above, stocker 20 is in a state where vertical movement is possible. By rotating stocker screw 27, disk D3 is brought to a height which lines up with the guide grooves in driven and fixed disk guides 30A, 30B.

When driven and fixed disk guides 30A, 30B are brought toward each other, disk D3 is clasped between the guides. Belt 31 is rotated in the clockwise direction. While disk D3 is rotating in the counter-clockwise direction, it is brought to the playback position. Afterwards, the disk loading operation is same as above. Clamper arm 50 is driven in the counter clockwise direction. Clamper 51 is brought to the central position of disk D3. When disk playback means 40 is raised, damper arm 50 pivots in the clockwise direction and retreats, leaving damper 51 on top of disk D3. Both driven and fixed disk guides 30A, 30B are then moved apart. By opening fixed disk guide 30B, second gear 37 engages with stopper 11. Straightening arm 33B pivots in the clockwise direction, opposing the force of spring 38, and separates from outer edge of disk D3.

Having described preferred embodiments of the invention, it is to be understood that the invention is not limited to those precise embodiments, and that various changes and modifications may be effected therein by one skilled in the art without departing from the scope or spirit of the invention as defined in the appended claims.

For example, according to the above described embodiment, the left side of the disk outer edge is guided by driven disk guide 30A, and the disk outer edge is driven by belt 31 inside guide 30A. Disks are shown to be transferred while being rotated. However, the present invention is not limited to this configuration. As indicated in U.S. Pat. No. 4,582,320, the disk outer edge can be driven and transferred by rollers which are supported in a freely pivoting manner to the chassis. It can also be transferred by pushing the disk outer edge towards the rear of the device by a freely pivoting arm. Furthermore, although second gear 37 which engages with first gear 36 is supported by fixed disk guide 30B in a freely pivoting manner, second gear 37 can be a rack gear which moves in parallel with the transfer direction of fixed disk guide 30B.

Furthermore, both driven and fixed disk guides 30A, 30B may be supported such that parallel movement is possible, but one disk guide can be fixed with respect to chassis 10, and the other disk guide can be supported so that it is capable of movement. In particular, if fixed disk guide 30B is fixed to chassis 10, if a stopper which engages with the side of second gear 37 is placed on driven disk guide 30A, straightening arm 33B can separate from the disk outer edge, coupled with the opening of driven disk guide 30A. If straightening arm 33B is made longer, guide block 33C can be eliminated. Furthermore, the disk playback device described above is a changer type disk playback device which is capable of disk storage in stocker 20, but the present invention can also be implemented for a single disk playback device which can only play back a disk which is inserted into the slot.

By the device of the present invention, when a disk is inserted into a device slot, a straightening arm straightens out the insertion position of a disk into the horizontal position. As a result, even if the operator inserts a disk in a sloped position, it does not contact the device's internal mechanisms such as the clamper. Damage to the disk can be prevented.

What is claimed is:

1. A disk transfer device with a means for maintaining an alignment of a disk comprising:

at least a first and second disk transfer guide;
   said at least a first and second disk transfer guides effective to guide a disk in a first and second direction;
   said first and second directions opposing one another;
   said first disk transfer guide having at least one guide element moveably mounted thereon;
   said at least one guide element effective to move to at least an angled position with respect to said first and second directions;
   said at least one guide element further effective to contact and guide an edge of said disk thereby maintaining said alignment during a movement of said disk; and
   a recessing means recessing said at least one guide element from said edge;
   a stopper disposed so that if at least one of said first and second disk transfer guides moves past a predetermined position, said stopper moves said at least one guide element toward a recessed position with respect to said edge.

2. A disk transferring device as in claim 1 wherein said recessing means comprises:

a first gear disposed on said at least one guide element;
   a second gear moveably mounted on said first disk transfer guide;
   said first and second gears mating with one another;
   a spring creating a biasing force biasing said second gear so that said at least one guide element is biased toward a front of said disk transferring device; and
   said stopper disposed so that if at least one of said first and second disk transfer guides moves past the predetermined position, said stopper moves said second gear against said biasing force thereby moving said at least one guide element away from said front of said disk transferring device and toward the recessed position with respect to said edge.

3. A disk transferring device as in claim 1 wherein said at least one guide element includes a sloped surface.

4. A disk transferring device as in claim 1 wherein said at least one guide element includes a guide groove.

5. A disk transferring device as in claim 1 further comprising:

at least one stationary guide element disposed on said first disk transfer guide.

6. A disk transferring device as in claim 1 wherein:

said at least one guide element includes a positioning pin; and
   said first disk transfer guide includes a hole effective to mate with said positioning pin.

7. A disk transferring device as in claim 1, wherein said first disk transfer guide includes a roller.

8. A disk transferring device as in claim 1, wherein said second disk transfer guide includes a roller.

9. A disk transferring device with a means for maintaining an alignment of a disk, comprising:

a first and second disk transfer guide;
   said at least a first and second disk transfer guides effective to guide a disk in a first and second direction;
   said first and second directions opposing one another;
   said first disk transfer guide having at least one guide element, at least one stationary element, and at least one hole;
   said at least one guide element moveably mounted on said first disk transfer guide and effective to contact and guide an edge of said disk thereby maintaining said alignment;

said at least one guide element further having a sloped surface, a guide groove, and a positioning pin;

said at least one guide element effective to move to at least an angled position with respect to said first and second directions;

said hole effective to mate with said positioning pin;

a first gear disposed on said at least one guide element;

a second gear moveably mounted on said first disk transfer guide;

said first and second gears mating with one another;

a spring creating a biasing force biasing said second gear so that said at least one guide element is biased toward a front of said disk transferring device;

a stopper; and said stopper disposed so that if at least one of said first and second disk transfer guides moves past a predetermined position, said stopper moves said second gear against said biasing force thereby moving said at least one guide element away from said front of said disk transferring device and toward a recessed position with respect to said edge.

10. A disk transferring device as in claim 9, wherein said first disk transfer guide includes a roller.

11. A disk transferring device as in claim 9, wherein said second disk transfer guide includes a roller.

* * * * *